United States Patent [19]

Yamashita

[11] Patent Number: 5,504,854

[45] Date of Patent: Apr. 2, 1996

[54] APPARATUS AND METHOD FOR INPUTTING CELL SHAPE AND POSITION AND INTER-CELL CALCULATION

[75] Inventor: Tetsuya Yamashita, Kawasaki, Japan

[73] Assignee: Fuji Xerox Co., Ltd., Japan

[21] Appl. No.: 245,002

[22] Filed: May 18, 1994

Related U.S. Application Data

[63] Continuation of Ser. No. 719,270, Jun. 21, 1991, abandoned.

[30] Foreign Application Priority Data

Jun. 25, 1990 [JP] Japan .................................. 2-166062

[51] Int. Cl.$^6$ ...................................................... G06F 3/00
[52] U.S. Cl. .......................................... 395/161; 395/159
[58] Field of Search .................................. 395/155–161, 395/133–137, 700, 500, 144–149; 364/488–492, 474.24; 345/117

[56] References Cited

U.S. PATENT DOCUMENTS

| | | | |
|---|---|---|---|
| 4,813,013 | 3/1989 | Dunn | 395/159 |
| 4,868,761 | 9/1989 | Hayashi | 364/474.24 |
| 4,914,568 | 4/1990 | Kodosky et al. | 395/159 |
| 5,041,992 | 8/1991 | Cunningham et al. | 395/131 |
| 5,197,120 | 3/1993 | Saxton et al. | 395/139 |
| 5,208,907 | 5/1993 | Shelton et al. | 395/161 X |
| 5,313,575 | 5/1994 | Beethe | 395/159 |
| 5,388,199 | 2/1995 | Kakazu et al. | 395/155 |

OTHER PUBLICATIONS

Robinson, "Premise Provides a Flexible Design Tool for Use Prior to CAD", Comp. Graphics World, Sep. 1989, pp. 117–121.

Yoshimoto et al, "Interactive Iconic Programming Facility in Hi-Visual", IEEE Workshop, Jun. 1986, pp. 34–41.

Clarisse et al, "An Icon Manager in Lisp", IEEE Workshop Jun. 1985, pp. 116–131.

Selker et al, "Elements of Visual Language", IEEE, 1988, pp. 38–44.

Hirakawa et al, "A Framework for Construction of Icon Systems", IEEE, 1988, pp. 70–77.

Ichikawa et al, "Visual Programming", IEEE Conf., Oct. 1987, pp. 129–137.

Hirakawa et al, "A Generic Model for Constructing Visual Programming Systems", IEEE, 1989, pp. 124–129.

Myer, "The State of the Art in Visual Programming and Program Visualization", CMU, 1988, pp. 1–25.

Primary Examiner—Mark R. Powell
Assistant Examiner—John E. Breene
Attorney, Agent, or Firm—Welsh & Katz, Ltd.

[57] ABSTRACT

A table calculating device used in an interactive data system based on a personal computer or the like. When an operator specifies a position and a shade with respect to an entry on a display screen of a display unit through such an input unit as a keyboard or a mouse, a generating section generates the entry having the specified shade at the specified position on the screen of the display unit. Through the repetition of the above procedure through the generating section, a plurality of entries having such specified shapes are displayed at a plurality of specified positions and corresponding tables are also generated. A copying section copies the entry at a position specified through the input unit on the display screen. A moving section moves the entry to a position specified through the input unit on the display screen. A shape changing section changes the shape of the entry to a shape specified through the input unit on the display screen. An erasing section deletes the entry on the display screen in response to a specified command from the input unit. An editing section carries out calculation on the basis of the respective data and displays the calculation results in the respective entries of the table. A managing section stores therein and manages the positions, shape and data of the respective entries.

12 Claims, 5 Drawing Sheets

|   | 1 | 2 | 3 | 4 |
|---|---|---|---|---|
| 1 |   | UNIT PRICE | QTY | SALES AMOUNT |
| 2 | MAIN UNIT | 248,000 | 25 | 6,200,000 |
| 3 | CRT | 98,000 | 25 | 2,450,000 |
| 4 | EXPANSION DISK | 165,000 | 6 | 990,000 |
| 5 | PRINTER | 88,000 | 12 | 1,056,000 |

COLUMN / ROW / 51 / 50

3@2   25

EDIT   COPY   MOVE   SAVE   ATTRIBUTE   WIDTH

APPARATUS AND METHOD FOR INPUTTING CELL SHAPE AND POSITION AND INTER-CELL CALCULATION

This is a continuation of application Ser. No. 07/719,270, filed Jun. 21, 1991 now abandoned.

BACKGROUND OF THE INVENTION

1. Field of the Invention

The present invention relates to table calculating devices which display a plurality of entries on a display unit and perform table calculation on the basis of data entered in the respective entries and more particularly, to a table calculating device which can freely set the position and shape of each of entries displayed on a display unit.

2. Description of the Related Art

In these years, there has been widely used an interactive data system which can handle various sorts of jobs on an interactive basis. The interactive data system, which is based on a personal computer, a workstation and so on, comprises a central processing unit for storing data and executing required processing, a display unit for displaying a processed result on its display screen, a keyboard or a mouse (pointing input device) for entering data or instructions necessary for data processing therethrough, a printer for providing a hard copy of the data as necessary, and an external memory for saving data therein. With such an interactive data system, when an operator or user enters a necessary command through the keyboard or mouse, a response to the entered command is immediately indicated on the screen of the display unit and the user enters a new command in response to the displayed response. Such procedure is repeated to obtain a desired processed result.

In one type of such a prior art interactive data system having a table calculating function, a plurality of entries are displayed as arranged in rows and columns on the screen of a display unit so that, when a user enters data in each of the entries, table calculation is carried out in accordance with a calculation equation previous set therein.

FIG. 5 shows an example of a table used for the table calculation. In this case, a table 51 consisting of 20 entries 50 marked off by column numbers "1" to "5" and row numbers "1" to "4" is displayed on the screen of the display unit and a user enters data such as characters, numeral values, etc. necessary for the table calculation in the entries. More specifically, in the case of such table calculation to find sales as the example of FIG. 5, the user enters article names, their unit prices and the quantity of such articles. This causes the sales amounts of the respective articles to be automatically calculated in accordance with a preset calculation equation (sales amount=unit price×quantity of articles) and then displayed in the respective sales amount fields.

Each time the unit price of each article or the quantity of articles is changed, the table calculation is again carried out with use of the latest data and therefore data and calculation results on which the table calculation is based can be always matched with each other.

Provided in the lower part of the table 51 on the display screen are an entry column/row number area 52 for showing the column and row numbers of an entry being currently selected through the mouse, an area 53 for showing data in the entry being now selected, and a command input area 54 for showing commands for changing the width and attribute of the entries in row and column directions, commands for copying, moving and deleting the entry and a command for changing the data in each entry or its calculation equation, to thereby allow the user to easily select and enter the necessary commands and data. When it is desired for the operator to enter desired data in one of the entries of the table, the operator specifies the target entry for data input through the cursor shift keys on the keyboard or through the operation of the mouse and then enters the desired data through the keyboard operation based on the editing command.

In this way, in the prior art table calculating device, any entry in the table is positioned and managed on the basis of its row and column numbers and the data display zone in the entry is uniquely determined by the preset row and column widths. In such a table as to have the structure mentioned above, when the table is arranged to have such a data array as to give priority to easy-to-see data, the data array structure is not matched with the regular entry matrix structure so that there occurs such an entry that no data is input at all; or conversely, when the table is arranged to have such a data array as to give priority to entry matrix structure, it becomes difficult to arrange data at its easy-to-see positions. In addition, the shade of the entries, which are inevitably set to be rectangular, is not always suitable for data entry because various sorts of data are entered in the entries.

SUMMARY OF THE INVENTION

It is an object of the present invention to provide a table calculating device in which any entry in a table can be located at any position with any shape to enable highly flexible table generation and an excellent interactive feature.

In accordance with an aspect of the present invention, there is provided a table calculating device which comprises display means for displaying on its display screen a table having a plurality of entries arranged therein, input means for providing various sorts of commands associated with the table, generation means, when a position on the display screen of the display means and a shape as one of the entries of the table are instructed from the input means, for generating the entry corresponding to the shade at the position, and editing means, when data for each of the entries of the table is instructed from the input means, for performing calculation based on the data and displaying a calculation result in the table.

In the present invention, since the entry having an arbitrary shape can be created at an arbitrary position through the generation means, the array structure of the entries in the table is not limited to such a regular one as in the prior art. When the user specifies data for a plurality of entries thus generated, the editing means carries out calculation based on the data and displays the calculation results in the respective entries in the table.

BRIEF DESCRIPTION OF THE DRAWINGS

FIG. 5 shows an example of a table displayed on a display screen in a prior art table calculating device.

DESCRIPTION OF THE PREFERRED EMBODIMENTS

Figure 1:
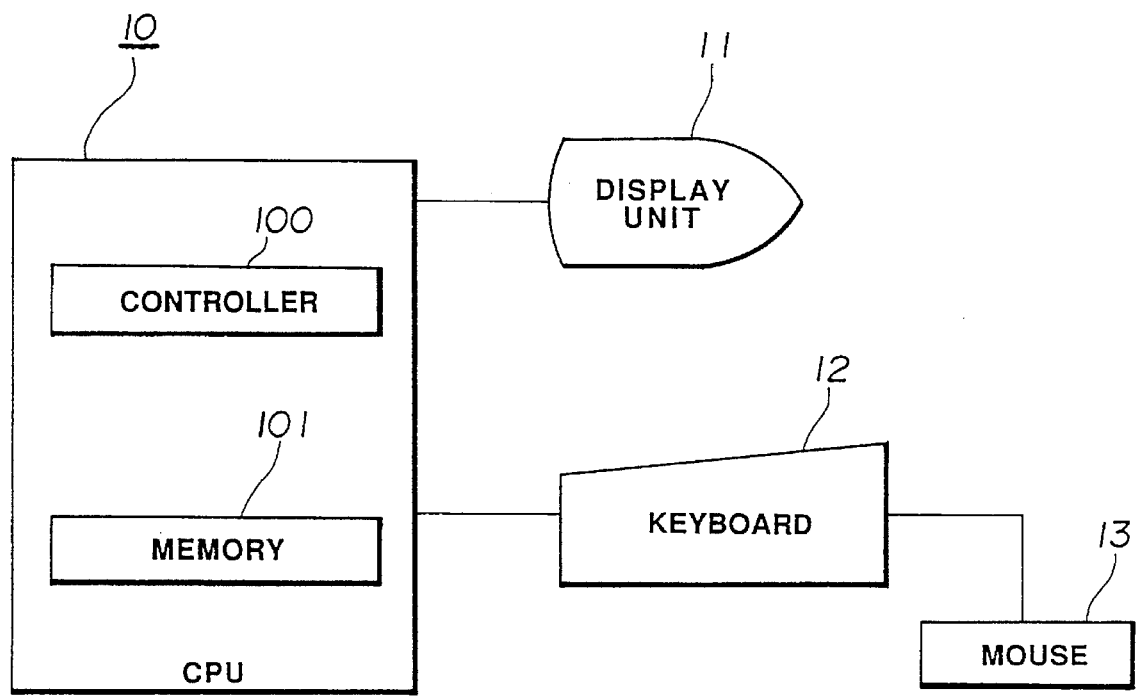
FIG. 1 is a block diagram of an interactive data system to which a table calculating device in accordance with the present invention is applied.

Referring to FIG. 1, there is shown a block diagram of an interactive data system to which an embodiment of a table calculating device of the present invention is applied. The illustrated system includes a central processing unit (CPU) 10, a display unit 11, a keyboard 12 and a mouse 13.

More specifically, the central processing unit 10, which comprises a controller 100 and a memory 101, is used to perform table calculation and so on according to a command entered on an interactive basis. The controller 100 responsive to an input through the keyboard 12 and the mouse 13 performs its data processing and display control over the display unit 11. The memory 101 is provided to store therein data entered for the data processing, data on the processed results, and so on.

The display unit 11 indicates a table or data necessary for the table calculation on its display screen. The mouse 13 is used to specify a position on the display screen of the display unit 11. For example, an operator of the mouse 13 can select one from a group of commands displayed on the display screen which are necessary for the table calculation.

Figure 2:
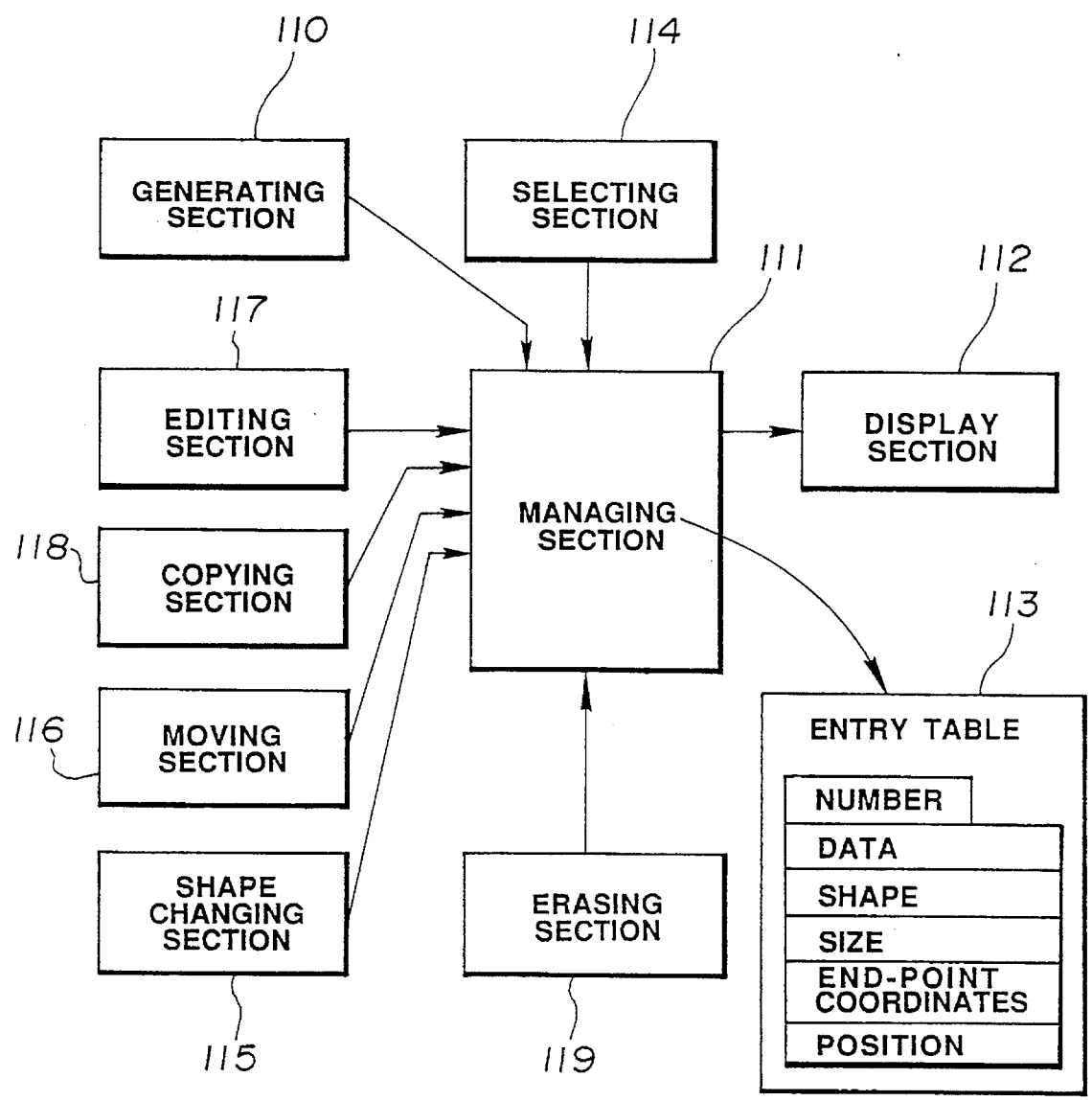
FIG. 2 is a block diagram for explaining the conception of such processing as generation, copy, movement, etc. for entries in the embodiment of FIG. 1.
Figure 3:
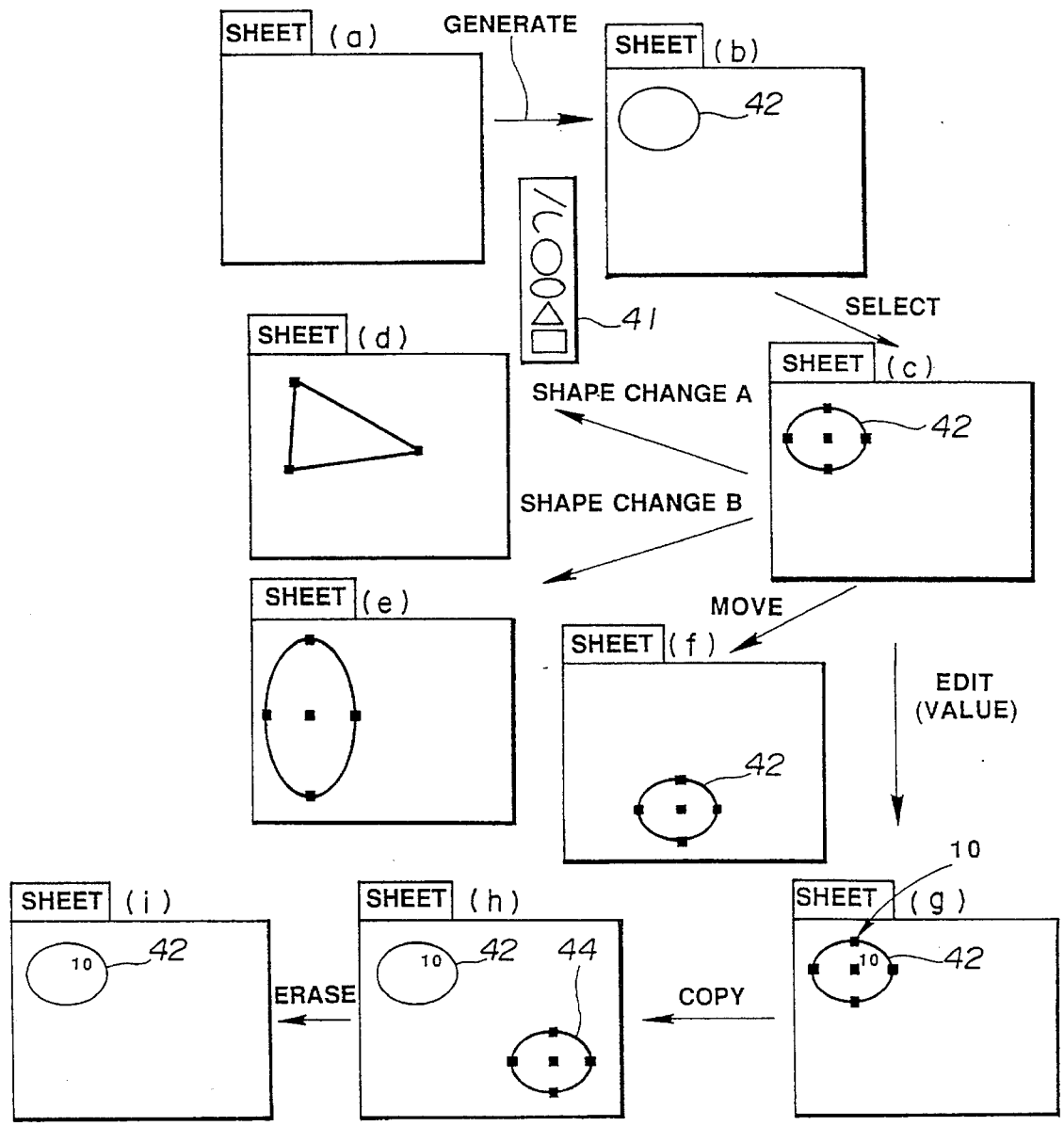
FIGS. 3 and 4 show entries on a display screen which are updated through the processing such as generation, copy, movement, etc. in the embodiment of FIG. 1, respectively.

FIG. 2 shows various processing processes to be executed in creating a table on the display screen, and FIG. 3 shows tables sequentially updated on the display screen according to the respective processing processes.

Explanation will be sequentially made as to the generation, copy and so on of a desired entry.

(1) Generation

When the operator starts the table calculation processing of the system, this causes display of a group of commands (not shown) indicative of generate, shade change, size change, end-point coordinates change, edit, copy, move, erase, and zone change in the lower part of the screen (part (a) of FIG. 3) of the display unit 11. When the operator moves a cursor (position identifier) on the display screen to the location named "generate" using the mouse 13 and presses a click button provided on the mouse, the command is selected. The selection of the command "generate" causes the activation of a generating section 110 previously prepared as a generation program in the controller 100, thereby generating an entry shape menu. The shape menu is transferred to a displaying section 112 under control of a managing section 111 previously prepared as an entry management program in the controller 100. This causes the displaying section 112 to indicate such an entry shape menu 41 as shown in FIG. 3 on the screen of the display unit 11. When the operator selects an ellipse entry as a desired shape from the shape menu 41 and then moves the cursor to a desired position on the display screen and specifies (that is, clicks) it using the mouse 13, this causes the generating section 110 to display an ellipse entry 42 at the specified position on the display screen under control of the managing section 111 as shown in part (b) of FIG. 3. At this time, the managing section 111 creates an entry table 113 for the ellipse entry 42. Registered in the entry table 113 are an identification number for distinction of the entry 42 from other entries, data indicative of a numeral value to be written or a calculation equation to be executed in the entry 42, the shape of the entry 42, the size of the entry 42, endpoint coordinates of the entry 42 and the position of the entry 42. If the identification number for the entry 42 is set at "1" for example, then the entry 42 is managed on the basis of the identification number "1".

Through the same generation processing as the above, a plurality of other entries having different shapes are similarly generated at respective positions on the display screen and correspondingly entry tables for these entries are sequentially created.

(2) Selection

In order to provide various operations to the thus-displayed entry, the operator must first select desired one of preset entries. For example, when the operator moves the cursor to the position of the ellipse entry 42 using the mouse 13 and then pushes the corresponding click button of the mouse 13, this causes a selecting section 114 prepared as a selection program in the controller 100 to select the entry 42 and display it b such a bold line as shown in part (c) of FIG. 3.

Subsequent to such selection processing of the entry the following processing (3) to (7) are selectively carried out.

(3) Shape Change

The operator can select either one of two sorts of modifications. One is selected when the operator wishes to change the shape of the entry, e.g., from ellipse to triangle; while the other is selected when the operator wishes to modify the size of the entry and the end-point coordinates of its contour line.

(3-A) Changing Shape

When the operator selects the command "shape change" among the group of commands appearing on the screen using the mouse 13, a shape changing section 115 prepared as a shape change program in the controller 100 is started. Thereafter, when the operator selects, for example, triangle from the displayed shape menu using the mouse 13, the shape changing section 115 changes the shape of the entry 42 from ellipse to triangle as shown in part (d) of FIG. 3. This causes the managing section 111 to modify the shape in the entry table 113 of the entry 42 from ellipse to triangle correspondingly.

(3-B) Changing Size and Attitude

When the operator selects the command "size change" from the group of displayed commands using the mouse 13, the shape changing section 115 is started. Further, the operator moves the cursor to the position of one of points (indicated by black squares) to be edited on the contour line of the entry 42 using the mouse 13 and then moves the cursor to a desired position while the click button of the mouse 13 kept pushed, this causes the shape changing section 115 to change the size of the entry 42 according to the above cursor movement, whereby, when the operator releases the click button, the size of the entry 42 is set as shown in part (e) of FIG. 3. In the event where the operator selects the command "end-point coordinates change" from the displayed command group, when the operator moves the cursor to the position of one of the four points (indicated by the black squares) on the contour line of the entry 42 using the mouse 13 and then moves the cursor to a desired position while the click button of the mouse 13 kept pushed, this causes the shape changing section 115 to rotate the entry according to the cursor movement, whereby, when the operator releases the click button, the attitude of the entry 42 is set as shown in part (e) of FIG. 3. As a result, the managing section 111 modifies the size and end-point coordinates in the entry table 113 of the entry 42.

(4) Movement

When the operator selects the command "move" using the mouse 13, this causes a moving section 116 previously prepared as a movement program in the controller 100 to be started. When the operator moves the cursor to the position of the entry 42 using the mouse 13 and then moves the cursor to a desired position while the click button-of the mouse 13 kept pushed, this causes the moving section 116 to move the entry 42 according to the cursor movement, whereby, when the operator releases the click button, the location of the entry 42 is set as shown in part (f) of FIG. 3. This results in that the managing section 111 modifies the position in the entry table 113 of the entry 42.

(5) Editing

When the operator selects the command "edit" using the mouse 13, this causes an editing section 117 previously prepared as editing program in the controller 100 to be started so that a message prompting the operator to enter data appears on the screen of the display unit 11. If the operator enters, for example, a number "10" from the keyboard 12, then this causes the editing section 117 to input the number "10" in the entry 42 as shown in part (g) of FIG. 3. Accordingly, the managing section 111 registers the number "10" as data in the entry table 113 of the entry 42.

(6) Copy

When the operator selects the command "copy" using the mouse 13, this causes a copying section 118 previously prepared as a copy program in the controller 100 to be started so that a message prompting the operator to specify a copying position appears on the screen of the display unit 11. If the operator specifies the copying position using the mouse 13, this causes the copying section 118 to copy the entry 42 at the specified position, whereby such a new entry 44 as shown in part (h) of FIG. 3 is displayed on the display screen. This causes the managing section 111 to generate a new entry table (not shown) with respect to the new entry 44. This new entry table has substantially the same structure as for the entry 42, except that its identification number and position of the entry 44 are different from those of the entry 42. For example, when the managing section 111 gives an identification number "2" to the new entry table of the entry 44, the entry 44 is managed on the basis of the identification number "2".

(7) Erasion

When the operator selects the command "erase" using the mouse 13, this causes an erasing section 119 previously prepared as an erase program in the controller 100 to be started, whereby the erasing section 119 deletes the entry 44 as shown in part (i) of FIG. 3. This results in that the managing section 111 erases the entry table corresponding to the entry 44.

Explanation will next be made as an example of table calculation by referring to FIG. 4.

Figure 4:
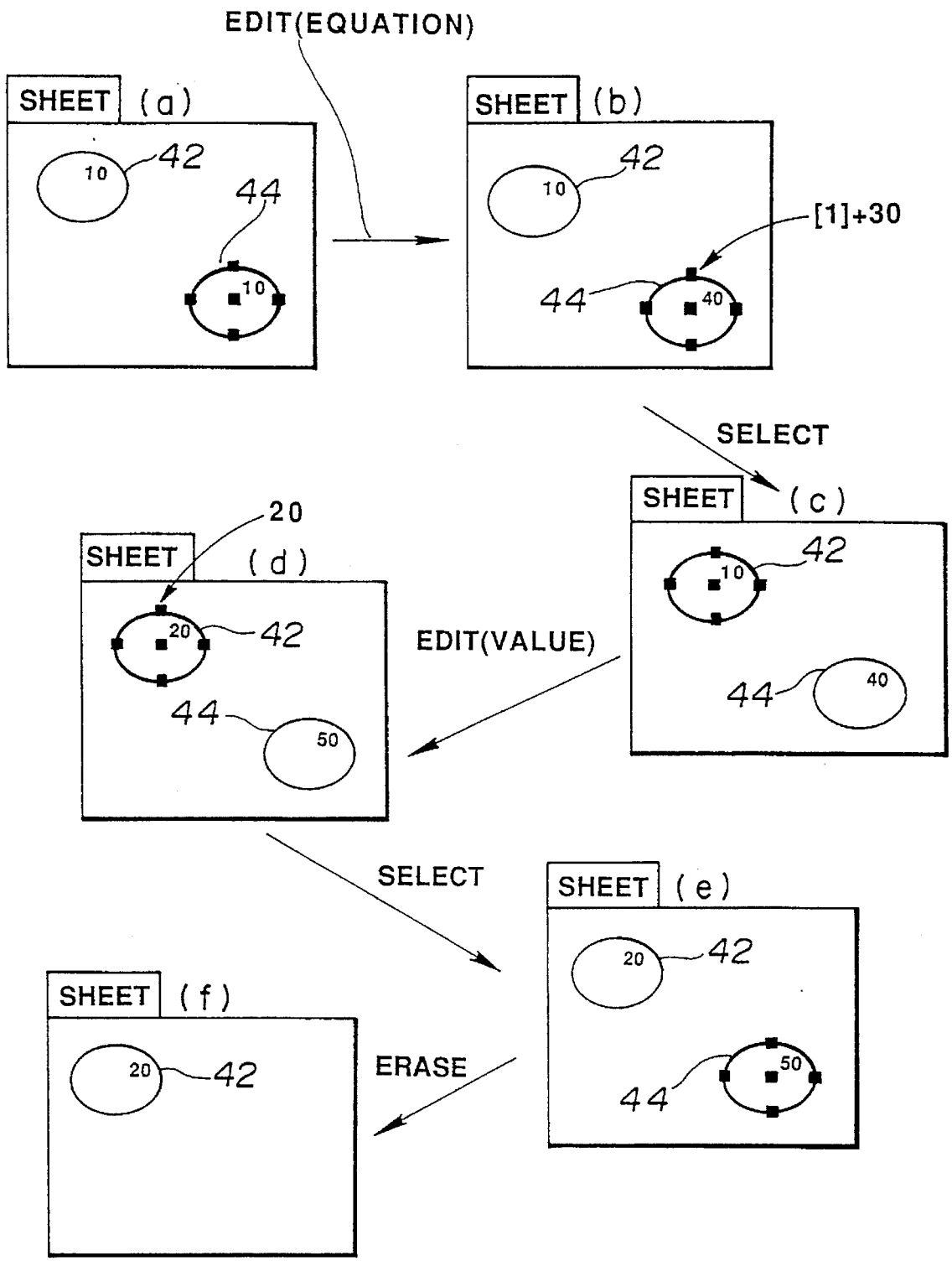

First, in the case where the display screen indicates such an entry state as shown in part (a) of FIG. 4, when it is desired to enter in the entry 44 a result of an addition of the number "10" in the entry 42 and a number "30", the operator selects he entry 44 and then selects the command "edit" using the mouse 13. This causes the editing section 117 to prompt the operator to enter a number or a calculation equation on the screen of the display unit 11. If the operator enters "{1}+30" as the calculation equation, then the equation is registered as data in the entry table of the entry 44, where {1} indicates the data (number "10") of the entry 42 having the identification number "1" in the equation. The editing section 117 performs calculating operation in accordance with the entered calculation equation and enters the calculation result in the entry 42. This results in that the number "10" in the entry 44 to be renewed to "40" as shown in part (b) of FIG. 4.

Subsequently, when the operator selects the entry 42 using the mouse 13 to provide such a display condition as shown in part (c) of FIG. 4 and then selects the command "edit", this causes the editing section 117 to prompt the operator to enter the number or calculation equation in the entry 42 on the display screen. If the operator renews the data of the entry table of the entry 42 from the number "10" to a number "20" through the keyboard 12, then this causes the data of the entry table of the entry 42 to be renewed from the number "10" to the number "20". And the computation of the aforementioned calculation equation is automatically carried out under the computation function of the editing section 117, whereby the number in the entry 44 is renewed to a number "50" (=20+30) as shown in Dart (d) of FIG. 4.

Next, when the operator selects the entry 44 using the mouse 13 to provide such a display state as shown in part (e) of FIG. 4 on the screen and then selects the command "erase", this causes the erasing section 119 to delete the entry 44 as shown in part (f) of FIG. 4. This results in that the managing section 111 deletes the entry table of the entry 44.

In the foregoing explanation, the entry tables of the entries 42 and 44 are stored in the memory 101, read out from the memory 101 when selecting various sorts of commands, and stored again in the memory 101 at the stage of completion of its necessary processing.

As has been disclosed in the foregoing, in accordance with the table calculation device of the present invention, since the position, shape, etc. of an entry for use in table calculation are managed on every data basis, the position, shade, etc. of the entry can be freely set, table preparing works in table calculation can be highly efficiently realized, and the prepared table can be made easy to see, unlike the prior art based on the matrix array.

What is claimed is:

1. An inter-cell calculating apparatus comprising:

display means for displaying a plurality of data displaying cells and at least one calculation result displaying cell;

first input means for inputting into the plurality of data displaying cells numeral data corresponding to numerals to be displayed in the plurality of data displaying cells;

second input means for inputting into the plurality of data displaying cells data displaying cell shape and position data indicative of geometric shapes and positions of the data displaying cells, wherein shape and position data are independent of numeral data;

third input means for inputting into the calculation result displaying cell a calculation equation which utilizes the numeral data corresponding to the numerals to be displayed in the plurality of data displaying cells;

fourth input means for inputting into the calculation result displaying cell calculation result displaying cell shape and position data indicative of a geometric shape and position of the calculation result displaying cell;

management means for managing the numeral data inputted by the first input means and the data displaying cell shape and position data inputted by the second input means in association with the plurality of data displaying cells, and also managing the calculation equation inputted by the third input means and the calculation result displaying cell shape and position data inputted by the fourth input means in association with the calculation result displaying cell;

data displaying cell display control means, based on the data displaying cell shape and position data managed by the management means in association with the plurality of data displaying cells, for controlling the display means to display the plurality of data displaying cells in the geometric shapes and positions indicated by the data displaying cell shape and position;

calculation result displaying cell display control means, based on the calculation result displaying cell shape and position data managed by the management means in association with the calculation result displaying cell, for controlling the display means to display the calculation result displaying cell in the geometric shape and position indicated by the calculation result displaying cell shape and position data;

numeral display control means, based on the numeral data managed by the management means in association with the plurality of data displaying cells, for controlling the display means to display the numerals corresponding to the numeral data in the plurality of data displaying cells;

calculation result display means for displaying in the calculation result displaying cell a result of calculation based on the calculation equation managed by the management means in association with the calculation result displaying cell; and display value changing means, in response to changes of numeral values displayed in the plurality of data displaying cells, for updating the numeral data managed by the management means and, in response to updating operation, for changing the calculation result displayed on the calculation result display means.

2. The inter-cell calculating apparatus as set forth in claim 1, wherein the data displaying cell display control means, in response to the change of the data displaying cell shape and position data inputted by the second input means, updates the data displaying cell shape and position data associated with the data displaying cells managed by the management means and, in response to the updating operation of the data displaying cell shape and position data, changes the geometric shapes and positions of the data displaying cells displayed on the display means.

3. The inter-cell calculating apparatus as set forth in claim 1, wherein the calculation result displaying cell display control means, in response to the change of the calculation result displaying cell shape and position data inputted by the fourth input means, updates the calculation result displaying cell shape and position data associated with the calculation result displaying cell managed by the management means and, in response to the updating operation of the calculation result displaying cell shape and position data, changes the geometric shape and position of the calculation result displaying cell displayed on the display means.

4. The inter-cell calculating apparatus as set forth in claim 1, wherein the data displaying cell display control means includes data displaying cell enlarging/reducing means for enlarging or reducing sizes of the data displaying cells displayed on the display means.

5. The inter-cell calculating apparatus as set forth in claim 1, wherein the data displaying cell display control means includes data displaying cell moving means for moving the data displaying cells displayed on the display means to other positions.

6. The inter-cell calculating apparatus as set forth in claim 1, wherein the data displaying cell display control means includes data displaying cell copying means for copying the data displaying cells displayed on the display means to other positions.

7. The inter-cell calculating apparatus as set forth in claim 1, wherein the data displaying cell display control means includes data displaying cell erasing means for erasing the data displaying cells displayed on the display means.

8. The inter-cell calculating apparatus as set forth in claim 1, wherein the calculation result displaying cell display control means includes calculation result displaying cell enlarging/reducing means for enlarging or reducing a size of the calculation result displaying cell displayed on the display means.

9. The inter-cell calculating apparatus as set forth in claim 1, wherein the calculation result displaying cell display control means includes calculation result displaying cell moving means for moving the calculation result displaying cell displayed on the display means to other positions.

10. The inter-cell calculating apparatus as set forth in claim 1, wherein the calculation result displaying cell display control means includes calculation result displaying cell copying means for copying the calculation result displaying cell displayed on the display means to other positions.

11. The inter-cell calculating apparatus as set forth in claim 1, wherein the calculation result displaying cell display control means includes calculation result displaying cell erasing means for erasing the calculation result displaying cell displayed on the display means.

12. A method of an inter-cell calculation comprising:

a first step of inputting into a plurality of data displaying cells numeral data corresponding to numerals to be displayed in the data displaying cells;

a second step on inputting into the plurality of data displaying cells data displaying cell shape and position data indicative of geometric shapes and positions of the data displaying cells, wherein shape and position data are independent of numeral data;

a third step of inputting into a calculation result displaying cell a calculation equation which utilizes the numeral data corresponding to the numerals to be displayed in the plurality of data displaying cells;

a fourth step of inputting into the calculation result displaying cell calculation result displaying cell shape and position data indicative of a geometric shape and position of the calculation result displaying cell;

a fifth step of displaying on display means, based on the data displaying cell shape and position data inputted in the second step, the plurality of data displaying cells in the geometric shapes and positions indicated by the data displaying cell shape and position data;

a sixth step of displaying on the display means, based on the calculation result displaying cell shape and position data inputted in the fourth step, the calculation result displaying cell in the geometric shape and position indicated by the calculation result displaying cell shape and position data;

a seventh step of displaying, based on the numeral data inputted in the first step, the numerals corresponding to the numeral data in the plurality of data displaying cells;

an eighth step of displaying the calculation result display cell a result of calculation based on the calculation equation inputted in the third step; and a ninth step of changing the calculation result displayed in the calculation result displaying cell in response to a change of numerals displayed in the plurality of data displaying cells.

* * * * *